Patented Aug. 5, 1941

2,251,693

UNITED STATES PATENT OFFICE 2,251,693

PREPARATION OF MONOGLYCERIDES

Albert S. Richardson and Eddy W. Eckey, Wyoming, Ohio, assignors to The Procter & Gamble Company, Cincinnati, Ohio, a corporation of Ohio No Drawing. Application March 24, 1939, Serial No. 264,041

11 Claims. (Cl. 260—411)

The present invention is concerned with the preparation of higher molecular weight fatty acid monoglycerides from fat and glycerol and is related to an invention made by A. S. Richardson, one of the present coinventors, for which application Serial No. 263,707 covering the preparation of monoglycerides from fatty acid and glycerin was filed March 23, 1939.

An object of the present invention is to react triglyceride fat with glycerol at relatively low temperature to form products rich in their content of monoglyceride.

Monoglycerides of the higher fatty acids are becoming increasingly important technically for use as emulsifying agents. The typical so-called monoglyceride found in commerce roughly consists of about one half monoglyceride and the remainder di- and triglyceride, which possess distinctly lower emulsifying power than the monoglyceride. Therefore there has been increasing need for an economical, easily operated process for preparing synthetic fat consisting principally of monoglyceride.

It has long been known that at temperatures above 250° C. glycerol can be made to react with a triglyceride fat whereby mono- and diglyceride are formed. More recently alkaline catalysts for the reaction have come into use, whereby the temperature of the reaction has been lowered in practice to about 150–200° C. The process as thus developed has many advantages, but the products obtained contain a large proportion of di- and triglycerides, often as high as fifty per cent, despite efforts to force the reaction toward the production of monoglyceride by employment of a large excess of glycerol. Still lower reaction temperature and higher yield of the monoglyceride are obviously desirable and are made practical by the present invention.

Our invention is applicable to the preparation of monoglycerides from both saturated and unsaturated triglycerides, being especially useful in working with unsaturated fats and other products lacking in stability at high temperature. The invention consists in the reaction at relatively low temperature of triglyceride fat with glycerol in the presence of boiling dioxane and a glyceroxide catalyst whereby a product light in color and unusually rich in monoglyceride is obtained. According to our improved process suitable proportions, as hereinafter more fully described, of neutral fat, glycerol, dioxane, and a glyceroxide catalyst are brought together in a suitable reaction vessel, agitated, and heated to boiling temperature, at which stage reaction between the triglyceride fat and glycerol takes place to form the monoglyceride. Since the boiling point of pure dioxane is about 101° C., the boiling point of the reaction mixture, and therefore the reaction temperature, in our process usually lies in the range of about 102° to about 115° C. The mixture is boiled until the desired glycerination is obtained.

Our invention will be more clearly understood from the following examples in which we describe specific methods of preparation of products rich in monoglyceride, it being understood, of course, that the specific limitations are by way of example only and that the scope of the invention is not to be limited thereto but rather by the breadth of the appended claims.

*Example I.*—A mixture of 30 parts cottonseed oil, 40 parts glycerol substantially free of water, 200 parts dioxane and about 0.6 part sodium glyceroxide are charged into a suitable reaction vessel provided with a reflux condenser. The mixture is agitated and boiled for about 1½ hours or until the reaction has reached substantial completion as will be indicated when the mixture becomes a clear homogeneous solution. The temperature of boiling will be in the neighborhood of 107° C. After the reaction has reached substantial completion the material is treated with a small amount of acid, such as hydrochloric acid, sufficient to neutralize the alkaline catalyst, following which the dioxane is distilled out with the aid of a slow stream of inert gas such as nitrogen under partial vacuum with the temperature held at 90–100° C. Most of the dioxane is thus recovered and the residue is then heated under a relatively high vacuum at a temperature of about 120° for about 30 minutes in order to substantially completely remove the last portion of dioxane. A mixture consisting mainly of excess glycerol and monoglyceride of light color with unsaturated bonds unaffected is thereby obtained. Most of the excess glycerol is removed from the reaction product by gravity, or if a somewhat purer product free from dissolved glycerol is desired, the excess glycerol may be removed by water washing or by treatment of the product under high vacuum with steam whereby the unreacted glycerol is removed by distillation. If an even purer product is desired, the reaction mixture may be mixed with a dilute solution of hydrochloric acid in water which is then treated with portions of a water insoluble fat solvent such as ethyl ether to extract the glycerides. The combined ether extractions may then be washed with water for purification and the monoglyceride recovered from the ether in a known manner.

*Example II.*—This example will illustrate another procedure which I have found particularly useful.

To about 40 parts of glycerol are added about 0.2 part sodium hydroxide and two or three volumes of toluene. This mixture is charged into a suitable reaction vessel equipped with stirrer, thermometer, water-trap, and reflux condenser, heated to boiling and rapidly stirred. Boiling and stirring are continued until no more water of reaction is evolved and the toluene drops into the trap without turbidity indicating that the formation of sodium glyceroxide has reached substantial completion. The toluene is then distilled off until the temperature of the glycerol reaches about 140° C. The glycerol containing the sodium glyceroxide catalyst is allowed to cool and about two thirds or three fourths of the 200 parts dioxane to be ultimately used are added thereto. This mixture is then brought to boil and a preheated solution of 30 parts substantially completely hydrogenated cottonseed oil in the remainder of the dioxane is added. This mixture is then boiled under a reflux condenser for an hour to an hour and a half, following which the monoglyceride formed is separated from the reaction mixture as indicated in Example I.

A product specifically prepared in accordance with Example II and isolated by ether extraction as indicated above contained about 2.4 per cent free fatty acid and about 82 per cent monoglyceride as judged from the saponification and hydroxyl numbers of the product, the balance of course being mainly a mixture of di- and triglycerides. The monoglyceride mixture thus prepared was extremely light in color and possessed superior surface activity as compared to the product prepared by simple reaction of triglyceride fat with glycerol in accordance with prior methods.

As will be observed from the above examples, we preferably use glycerol which has been substantially freed of water. However, we do not wish to be limited to this detail. Our experimental work has indicated that the process may be carried out in the absence of water or in the presence of such amounts of water as are insufficient to cause reaction of the glyceroxide catalyst with the tri-glyceride fat, whereby soap is formed and the content of catalyst is either completely destroyed or reduced to an ineffective amount. Although under some conditions water acts quantitatively to destroy alcoholates such as glyceroxide, apparently the dioxane employed in our invention attenuates the action of water and a catalytically active amount of glyceroxide can exist in equilibrium even with as much as one mole of water per mole of glyceroxide.

In carrying out our improved process the proportion of triglyceride fat to glycerol is not critical, but of course it is essential to have at least two molar proportions of glycerol for each molar proportion of fat in order that sufficient glycerol may be present for monoglyceride production. Since excess glycerol forces the reaction in the direction of monoglyceride formation, we prefer to employ a considerable excess over the theoretical and normally carry out the reaction with from 4 to 14 molar proportions of glycerol for each molar proportion of fat. Proportions of glycerol in excess of the maximum of the preferred range may be employed without detrimental effect, but we have found no particular advantage in the use thereof.

The amount of dioxane which may be employed in the practice of our invention is not sharply critical but of course it does have some effect on the rate at which the reaction between the glycerol and triglyceride fat takes place, and also on the temperature at which the dioxane boils, larger proportions of dioxane resulting in lower reaction temperatures and favoring the equilibrium we desire. We have obtained satisfactory results using an amount of dioxane equal to the combined weight of the glycerol and triglyceride fat but lesser amounts may be employed with distinct advantage over processes involving the prior methods of reaction. The maximum amount is unlimited and is controlled mainly by economic and practical considerations. The preferred amount of dioxane is one which will give a high glycerol to fat ratio actually in homogeneous solution so that when equilibrium is obtained the reaction products are predominantly monoglyceride. More definitely, our preferred range is from two to four times the combined weight of glycerol and triglyceride fat. In all cases the temperature of reaction is the boiling point of the mixture of fat, glycerol, dioxane, and catalyst, and under nearly all practical conditions this temperature will be below 120° C.

The fatty materials which are employed to form the most useful products of our invention are the naturally occurring vegetable and animal glyceride fats and oils whose fatty acid radicals contain eight or more carbon atoms, such as coconut oil, tallow, soybean oil, peanut oil, cottonseed oil, marine oils, etc., and the saturated or partially saturated products prepared by the hydrogenation of same.

The glyceroxide catalyst may be separately prepared and added to the reaction mixture or may be formed in the glycerol, preferably before the latter is mixed with the fat. Such catalyst may be prepared conveniently by the addition of any suitable compound to the reaction mixture, such as another alcoholate as sodium ethylate or methylate, or by the reaction of a hydroxide of an alkali or alkaline earth metal with the glycerol as illustrated in Example II. When another alcoholate is added to the reaction mixture, double decomposition between said alcoholate and glycerol takes place with the resultant formation of glyceroxide. In the practice of our invention we prefer to employ sodium glyceroxide which may be easily and cheaply prepared from sodium hydroxide and glycerol but suitable catalysts can also be made from glycerol and other alkaline materials such as barium hydroxide, calcium hydroxide, sodium carbonate, potassium carbonate, and metallic sodium. The quantity of actual glyceroxide catalyst required for satisfactory operation of the invention is small, being usually about 0.01 to 0.2 mole per mole of total glycerol employed. Smaller quantities may be employed but of course result in lower rate of reaction and possibly also in lower conversion to monoglyceride.

Having thus described our invention, what we claim and desire to secure by Letters Patent is:

1. An improved process for reacting triglyceride fats and oils with glycerol to form a product rich in monoglyceride, comprising boiling a mixture of one molar proportion of said fat or oil, at least two molar proportions of glycerol, dioxane, and a glyceroxide catalyst.

2. An improved process for reacting triglyceride fats and oils with glycerol to form a product rich in monoglyceride, comprising boiling a mixture of one molar proportion of said fat or oil, approximately 14 molar proportions of glycerol, dioxane, and a glyceroxide catalyst.

3. An improved process for reacting fats and oils with glycerol to form a product rich in monoglyceride, comprising boiling a mixture of one molar proportion of fat or oil, at least two molar proportions of glycerol, a glyceroxide catalyst, and an amount of dioxane which is equal to at least twice the combined weight of glycerol and fat or oil.

4. An improved process for reacting fats and oils with glycerol to form a product rich in monoglyceride, comprising boiling a mixture of glycerol and a naturally occurring triglyceride fat or oil in relative proportion favoring the formation of monoglyceride, dioxane, and a glyceroxide catalyst, and refluxing the dioxane.

5. An improved process for reacting fats and oils with glycerol to form a product rich in monoglyceride, comprising boiling a mixture of glycerol, a naturally occurring triglyceride fat or oil, dioxane, and a glyceroxide catalyst, refluxing the dioxane until the desired reaction is obtained, subsequently neutralizing the catalyst, and separating the dioxane from the reaction product, the said glycerol and triglyceride being in relative proportion favoring the formation of monoglyceride.

6. An improved process for reacting an unsaturated triglyceride with glycerol to form a product rich in monoglyceride of light color with unsaturated bonds unaffected, comprising boiling a mixture of glycerol, an unsaturated triglyceride, dioxane, and a glyceroxide catalyst, refluxing the dioxane until the desired reaction is obtained, subsequently neutralizing the catalyst, and separating the dioxane from the reaction product, the said glycerol and triglyceride being in relative proportion favoring the formation of monoglyceride.

7. An improved process for making a product rich in monostearin comprising boiling a mixture of one molar proportion of substantially completely hydrogenated cottonseed oil, about 14 molar proportions of glycerol, a small amount of sodium glyceroxide as catalyst, and an amount of dioxane equal to at least twice the combined weight of the fat and glycerol, refluxing the dioxane until the equilibrium has been reached, subsequently neutralizing the esterification catalyst and separating the dioxane from the reaction product.

8. In the process of forming a product rich in monoglyceride by reaction of a triglyceride with glycerol in suitable proportions and in the presence of boiling dioxane and a glyceroxide catalyst, the step of contacting the proportion of glycerol with a hydroxide of a metal of the group of alkali and alkaline earth metals whereby a metal glyceroxide is formed in catalytic amount prior to the combination of the glycerol with the triglyceride and dioxane.

9. In the process of forming a product rich in monoglyceride by reaction of a triglyceride with glycerol in suitable proportions and in the presence of boiling dioxane and a glyceroxide catalyst, the step of contacting the proportion of glycerol with sodium hydroxide, whereby sodium glyceroxide is formed in catalytic amount prior to the combination of the glycerol with the triglyceride and dioxane.

10. An improved process for reacting triglyceride fats and oils with glycerol to form monoglyceride comprising boiling a mixture of fat or oil, glycerol and dioxane.

11. An improved process for reacting triglyceride fats and oils with glycerol to form monoglyceride comprising boiling a mixture of fat or oil, glycerol, a glyceroxide catalyst, and dioxane, the temperature of the boiling mixture being in the range of about 102° C. to 120° C.

ALBERT S. RICHARDSON.
EDDY W. ECKEY.